C. A. KRAMER.
LIFTING AND SUPPORTING DEVICE.
APPLICATION FILED NOV. 17, 1915.
1,196,790.
Patented Sept. 5, 1916.
2 SHEETS—SHEET 1.
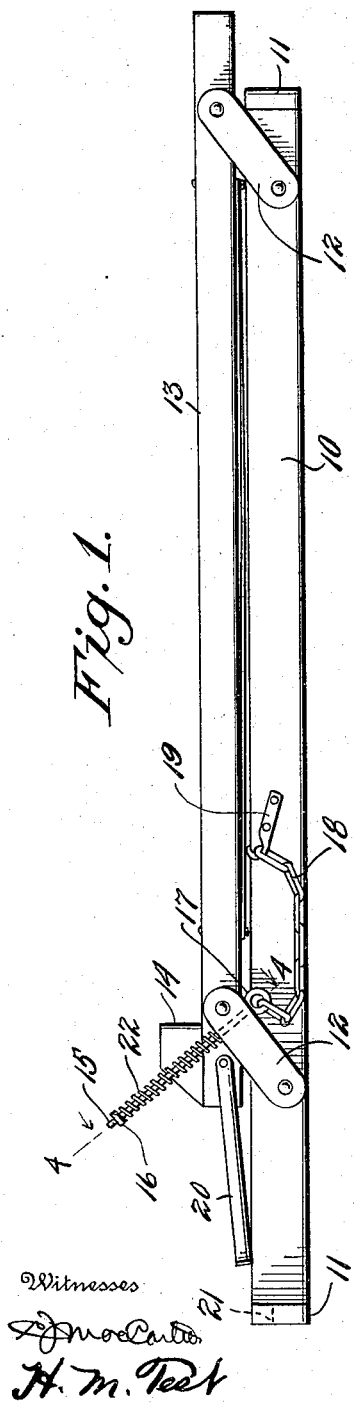
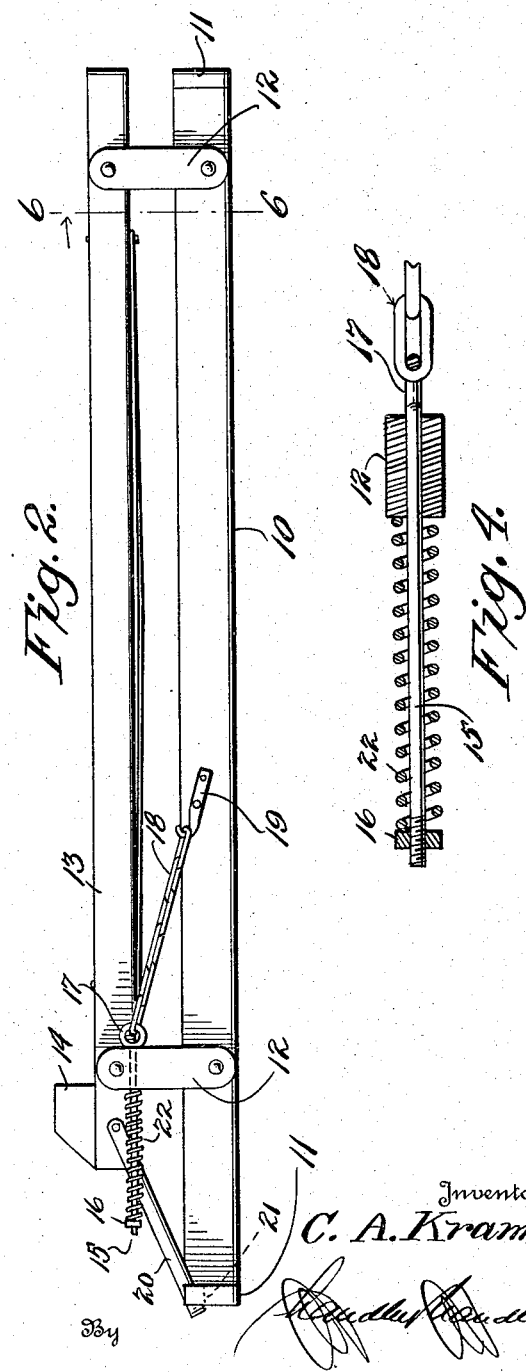
Inventor
C. A. Kramer C. A. KRAMER.
LIFTING AND SUPPORTING DEVICE.
APPLICATION FILED NOV. 17, 1915.
1,196,790.
Patented Sept. 5, 1916.
2 SHEETS—SHEET 2.
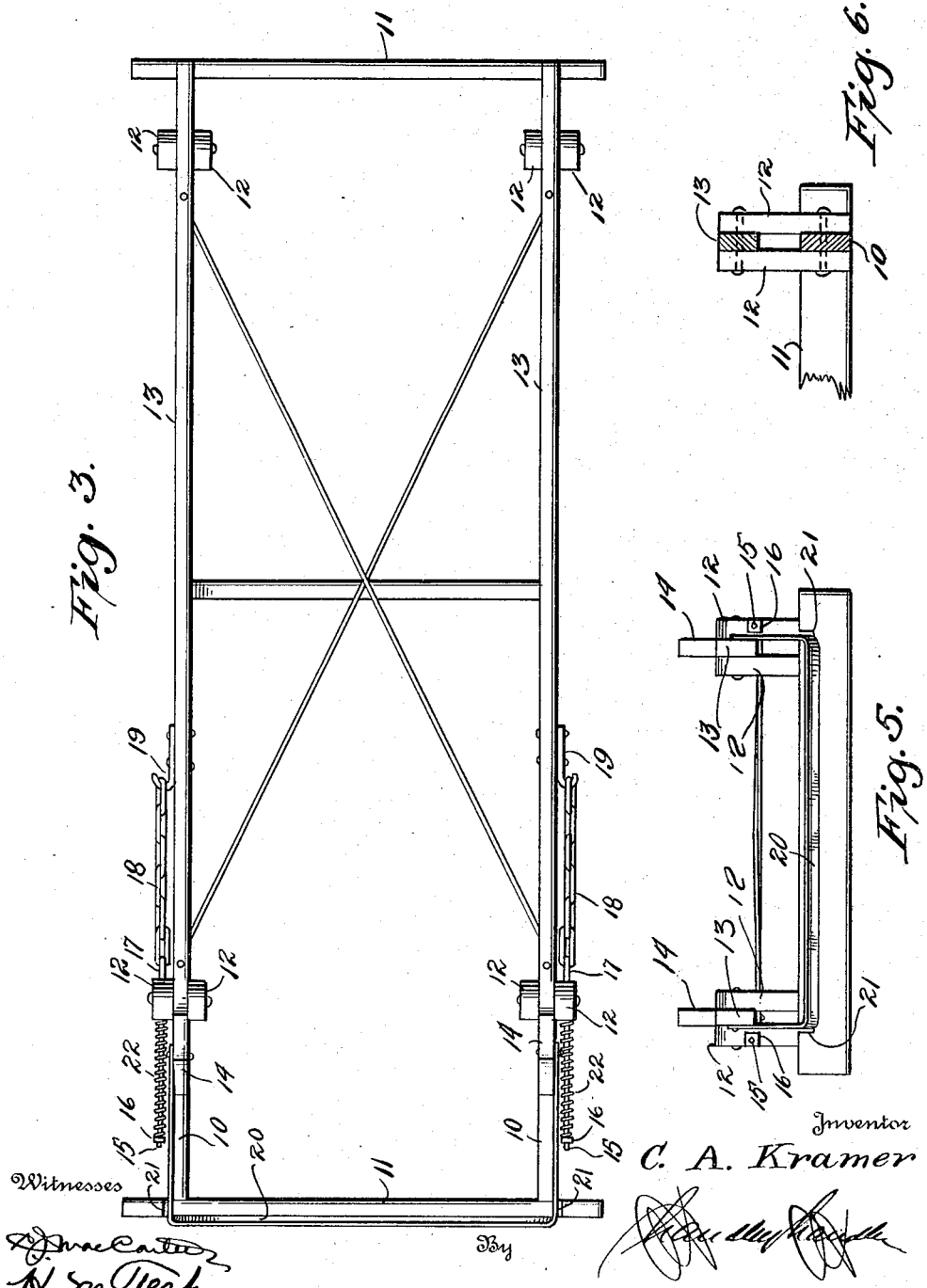
Inventor
C. A. Kramer
Witnesses
Attorneys

UNITED STATES PATENT OFFICE.

CHARLES A. KRAMER, OF CURRAN, ILLINOIS.

LIFTING AND SUPPORTING DEVICE.

1,196,790.  Specification of Letters Patent.  Patented Sept. 5, 1916.

Application filed November 17, 1915. Serial No. 61,964.

*To all whom it may concern:*

Be it known that I, CHARLES A. KRAMER, a citizen of the United States, residing at Curran, in the county of Sangamon, State of Illinois, have invented certain new and useful Improvements in Lifting and Supporting Devices; and I do hereby declare the following to be a full, clear, and exact description of the invention, such as will enable others skilled in the art to which it appertains to make and use the same.

This invention relates to improvements in lifting and supporting devices, and particularly to devices for use in garages for elevating and supporting automobiles to relieve the strain on the tires.

One object of the invention is to provide a novel and simple device of this character which automatically operates to lift the automobile when the front axle of the automobile contacts with a part of the device.

Another object is to provide a novelly constructed device for absorbing the shock incident to the engagement of the front axle against the device.

A further object is to provide a novel means for automatically locking the device after it has elevated the automobile, thereby effectively supporting the same.

Other objects and advantages will be apparent from the following description when taken in connection with the accompanying drawing.

In the drawing: Figure 1 is a side elevation of the device in lowered position; Fig. 2 is a side elevation of the device in elevated position; Fig. 3 is a top plan view; Fig. 4 is a section on the line 4—4 of Fig. 1; Fig. 5 is an end view; and Fig. 6 is a sectional view on the line 6—6 of Fig. 2.

Referring particularly to the accompanying drawing, there is shown a horizontal frame including the longitudinal parallel members 10 and the transverse connecting end members 11. Pivoted on each of the side members 10 and adjacent the end thereof are the upwardly extending links 12. The upper ends of these links are pivotally connected to the opposite ends of a pair of longitudinally extending parallel bars 13, these bars being adapted to swing in parallel relation upwardly and forwardly to support an automobile clear of the ground. At one end of each of the bars 13 is an upwardly extending block 14, against which the front axle of an automobile is adapted to engage to accomplish the upward and forward swinging of the said members.

Extending through each of the forward links 12 is a bolt 15, the forward end of which carries an adjusting nut 16, while the other end which projects through the opposite side of the link is formed with an eye 17 to which is connected one end of a chain 18. The other end of this chain is connected to a hook member 19 carried by the side member 10 of the frame. Pivotally connected by its arms to the forward ends of the bars 13 is a yoke 20. One end of each of the end members 11 projects beyond a side member 10, and one of these projections is formed with a notch 21 for the reception of a portion of one of the arms 20, the transverse portion of the yoke engaging the outer face of the said transverse member and the other arm passing downwardly along the side of the other side member.

In the operation of the device, an automobile is propelled longitudinally over the device from the rear end, until the front axle strikes the blocks 14. The impact of the axle against the blocks will cause the members 13 to be swung upwardly so that the automobile will be elevated above the ground. The impact of the axle against the blocks causes the compression of the springs 22, which are carried by the bolts between the nuts and links, thereby absorbing the shock. The yoke will automatically slide over the transverse member and engage therewith to hold the side bars 13 in elevated position.

What is claimed is:

An automobile jack comprising a horizontal frame, the end members of which extend beyond the sides thereof and are provided with notches in their upper portions, links pivotally connected to the ends adjacent the side members thereof, longitudinally extending parallel bars pivotally supported at the upper ends of the links, bolts slidable through certain of the links, adjusting nuts carried by the outer ends of the bolts, springs carried by the bolts between the nuts and the links, chains connected to the other ends of the bolts and to the frame, and a yoke pivotally connected to the parallel bars and arranged to engage in the notches of the frame.

In testimony whereof, I affix my signature, in the presence of two witnesses.

CHARLES A. KRAMER.

Witnesses:
J. PENBOOM,
H. F. BLACK.

Copies of this patent may be obtained for five cents each, by addressing the "Commissioner of Patents, Washington D. C."